No. 632,271. Patented Sept. 5, 1899.
G. MARTEL.
THRESHING MACHINE.
(Application filed Apr. 19, 1898.)
(No Model.) 6 Sheets—Sheet 3.

Gideon Martel,
Inventor:-

No. 632,271. Patented Sept. 5, 1899.
G. MARTEL.
THRESHING MACHINE.
(Application filed Apr. 19, 1898.)

(No Model.) 6 Sheets—Sheet 6.

Witnesses Gideon Martel Inventor
By his Attorneys,

United States Patent Office.

GIDEON MARTEL, OF CHIPPEWA FALLS, WISCONSIN.

THRESHING-MACHINE.

SPECIFICATION forming part of Letters Patent No. 632,271, dated September 5, 1899.

Application filed April 19, 1898. Serial No. 678,180. (No model.)

*To all whom it may concern:*

Be it known that I, GIDEON MARTEL, a citizen of the United States, residing at Chippewa Falls, in the county of Chippewa and State of Wisconsin, have invented a new and useful Threshing-Machine, of which the following is a specification.

My invention relates to improvements in threshing-machines; and the object that I have in view is to provide a machine in which the grain may be rapidly separated from the straw and chaff and the grain winnowed and cleaned of refuse and chaff in a superior manner to emerge from the machine in a thoroughly cleaned condition.

In my threshing-machine I have embodied three several and distinct systems for carrying the straw, chaff, and grain through the machine and to effect the separation of the grain from the straw and chaff during its progress through the machine. Simultaneously with the treatment that the grain receives from the shaking-separator and conveyer mechanisms it is subjected to the blast from a fan in addition to the blast from the fan which is associated with the cleaning-shoe. I have also provided a novel construction of the primary or upper shaking-separator and conveyer system arranged to carry the straw from front to rear of the machine and to effect the initial separation of the grain from the straw, and with this primary upper shaking-separator and conveyer system is associated a secondary intermediate conveyer arranged immediately below the primary system and driven positively in a reverse direction to the line of travel of said upper system for the purpose of conveying the grain from rear to front of the machine and delivering such grain to the third shaking-separator and conveyer system, which also embodies means for shaking and separating the chaff from the grain. With this third and lower conveyer system is combined the primary blower or fan, by which the chaff and fine straw are separated from the grain, and said lower conveyer system delivers the grain directly to the cleaning-shoe, by which the grain is finally cleaned through the action of the sieves therein and the blast-fan associated with said shoe. This cleaning-shoe is mounted in the casing or frame of the machine to partake of an endwise reciprocating motion longitudinally of the machine, and it is driven positively by connections with one of the rotary machine-shafts.

The several mechanisms are all operatively connected together to work in unison, and devices are provided throughout the machine which prevent lodgment and entanglement of the straw or chaff with the working parts.

The invention further consists in the novel combination of elements and in the construction and arrangement of parts, which will be hereinafter fully described and claimed.

To enable others to understand my invention, I have illustrated the preferred embodiment thereof in the accompanying drawings, forming a part of this specification, and in which—

Like numerals of reference denote like and corresponding parts in each of the several figures of the drawings.

In carrying my invention into practice I construct the main frame and casing 1 in a suitable manner to accommodate the several working mechanisms which enter into the construction of the machine; but as this frame or casing is not a material part of the invention I have not deemed it necessary to particularly illustrate and describe the same.

As is usual in this art, I employ a toothed threshing-cylinder 2, situated transversely across the front end of the machine and having its shaft $2^a$ journaled in suitable bearings on the machine-frame, said shaft having a driving-pulley $2^b$, around which is passed a belt (not shown) for positively driving this threshing-cylinder. Beneath the toothed threshing-cylinder is arranged the concave 3, which is suitably supported in the frame 1, and this concave has its rear end extended, as at 4, to carry a series of transverse slats 5. These slats are spaced at suitable intervals from each other to provide openings between the same for the passage of grain to the vibrating straw board or rack, presently referred to, and with the slatted part of the concave is combined a rotary beater 6. This rotary beater lies in rear of and parallel to the threshing-cylinder and extends transversely across the machine from side to side thereof, and the shaft $6^a$ of this beater is journaled on the machine-frame, one end of said shaft being extended beyond said frame or casing and equipped with a driving-pulley $6^b$.

My invention contemplates the employment of an upper shaking-separator and conveyer system having its several parts arranged in inclined relation to each other to extend rearwardly from the threshing-cylinder and beater entirely through the machine to the rear delivery end thereof, and this upper shaking-separator and conveyer system serves to effect the initial separation of the grain from the straw and to carry the major portion of the straw longitudinally through the machine and deliver the same to the stacker. This upper shaking-separator and conveyer system comprises in its entirety a number of working parts, and I will now proceed to describe in detail the several elements of said conveyer system. The first element of the upper conveyer system which I will describe is the vibrating straw board or rack 7. This straw board or rack 7 has its front receiving end situated below the threshing and beating cylinders, and it extends in an upwardly-inclined direction rearwardly to the first conveyer of the upper conveyer system. The vibrating straw board or rack 7 embodies a frame $7^a$, carrying two series of transverse slats. The slats 8 at the lower front part of the cylinder are triangular in cross-section and assembled to have their edges abut against each other to impart a step-shaped appearance to the straw board or rack 7 from a point at the front end thereof to a point about or a little in rear of the center of said straw board or rack, thus forming an imperforate stepped section on the straw board or rack which receives the grain and straw directly from the threshing and beating cylinders. The other series of slats 9 of this vibrating straw board or rack are triangular in cross-section; but they are attached to the frame of said board or rack to provide the spaces or slots $9^a$ between themselves, and thus the upper delivery part of this straw board or rack has a series of openings separated by the spaced slats, whereby the rack is adapted to sustain the straw and chaff upon itself and permit the grain loosened from the straw to pass through the openings or slots upon the lower conveyer and in the path of the blast from the primary fan. The front end of the vibrating straw board or rack is hung beneath the threshing-cylinder by means of the rock-shaft 11, which is suitably attached to the frame $7^a$ of said board or rack and has its cranked ends $11^a$ journaled in suitable bearings on the frame 1. The slotted rear part of the said straw board or rack is in like manner sustained by means of a rear rock-shaft 12, that extends across the machine and is suitably connected to the frame $7^a$ of said board or rack, and the cranked ends 13 of said shaft 12 are journaled in bearings, also attached to the frame 1. This inclined vibrating straw board or rack is positively actuated by means of a crank-shaft 14, which is journaled on the frame 1 at a point between the rock-shafts 11 12, which suspend the straw board or rack within the machine, and this operating-shaft 14 is connected operatively with the straw-board by means of the arm 16, said arms being attached at one end to the sides of the straw board or rack 'and having their opposite ends fitted to the cranks of the shaft 14. At one end this crank-shaft 14 for driving the straw board or rack is extended beyond the machine-casing, and to said extended end thereof is rigidly fastened the large driving-pulley 15 and the smaller pulley 122, adapted to drive the return tailings-elevator.

The front shaking-separator and conveyer of the upper conveyer system is indicated in its entirety at 18, and said front conveyer is arranged in an upwardly and rearwardly inclined position from the delivery end of the vibrating straw board or rack, the rear end of said front conveyer 18 lying in a horizontal plane considerably elevated above the rear delivery end of said inclined straw board or rack, while the front receiving end of said inclined front conveyer 18 lies beneath and in close relation to said straw board or rack 7 to receive the straw and chaff having the grain mixed therewith directly from said board or rack 7. The front conveyer 18 is driven positively by means of a shaft 19, which is journaled in suitable bearings 19ª, provided on the frame or casing 1. The frame 20 of this front conveyer is hung or loosely mounted on the driving-shaft 19, and the other or free end of this conveyer-frame 20 carries an idler-roller 21. The idler-roller is journaled loosely in the frame 20, at or near the lower part thereof, contiguous to the delivery end of the straw board or rack, and said idler-roller is parallel to the driving-shaft 19. The conveyer 18 consists of a pair of endless bands or chains passing around the idler-roller 21 and a driving-roller 19ᵇ on the shaft 19, and to said endless bands or chains are attached the transverse slats 22, which are provided with the forwardly-inclined teeth 23 of suitable length to extend beyond the corrugated straw bars or rods 24. These straw bars or rods 24 are attached to and carried by the frame 20 of the front conveyer 18, and said straw bars or rods are arranged parallel to each other lengthwise of the conveyer and at a suitable distance above the same. Said bars or rods 24 are corrugated throughout their length to present an irregular working surface to the straw as it passes over the front conveyer 18, and the described construction of said corrugated bars or rods serves to agitate the straw and chaff as they are carried along by the toothed bars of said endless conveyer, thereby serving to in a measure free the grain from the straw and chaff. The corrugated bars or rods are attached rigidly at their front ends to the front cross-rail of the conveyer-frame 20, and while the said rods or bars are attached near their rear ends to the rear cross-rail of said frame 20 said rods or bars do not terminate at said rear cross-rail, because they are extended or projected in a downwardly-inclined direction from the conveyer and its frame, thereby forming a series of delivery-fingers 25, that overhang the rear conveyer 27 of the upper conveyer system.

It will be observed that the frame 20 of the front inclined conveyer 18 is hung on the driving-shaft 19, thus allowing the lower front end of said conveyer-frame to move a limited distance vertically in the main frame or casing 1; but the descent of this frame and the conveyer thereon is limited by suitable stops, which are shown in the drawings as suitable blocks 20ᵇ; but the means for limiting the movement of said tiltable conveyer-frame is not material, as the same may be changed at pleasure.

I prefer to have the front lower end of the inclined front conveyer 18 terminate at a short distance in rear of the slotted or open rear end of the straw board or rack 7, and the space between said straw board or rack and the front inclined conveyer 18 is closed against the passage of straw and chaff by means of a series of fingers 26, which are attached to and movable with the delivery end of the straw board or rack 7. These fingers 26 are bent or corrugated throughout their length, and they are arranged parallel to each other transversely across the straw board or rack. The front ends of said corrugated or irregularly-formed fingers 26 are attached rigidly to the rack or board 7 in any suitable way, and said fingers project well over the conveyer 18; but they do not contact therewith, because they lie in a plane above said conveyer and its corrugated bars or rods 24. These fingers serve to catch the straw and chaff as they pass from the slotted board or rack 7 and to deliver the same to the conveyer 18 in a manner to effectually prevent the straw and chaff from passing to the intermediate return-conveyer, presently described, between the vibrating straw-board and the endless traveling conveyer 18.

The rear traveling conveyer 27, forming a part of the upper conveyer system, is similar in all substantial respects to the front shaking-separator and conveyer 18; but this rear conveyer 27 is arranged in such an inclined position that its rear delivery end terminates in substantially the same horizontal plane as the corresponding end of the front conveyer 18, while the front receiving end of said conveyer 27 is on a plane below the rear delivery end of the conveyer 18. The rear conveyer consists of a pair of endless belts or chains which carry a series of transverse slats 31, rigidly attached to the belts or chains, and said slats or bars 31 have the forwardly-extending teeth 32. The rear endless conveyer 27 is mounted in a frame 29, the rear end of which is loosely hung on the driving-shaft 28, situated at the upper end of said conveyer 27, and said frame 29 carries the idler-roller 30, which is suitably journaled in the lower front part of the frame, the belts or chains of said conveyer 27 passing around said idler-roller 30 and a driving-roller 28ª on the driving-shaft 28. The frame 29 of this inclined rear conveyer 27 carries a series of corrugated bars 33 similar to the corrugated bars 24 of the front inclined conveyer 18, and the front ends of said corrugated bars 33 are attached rigidly to the front cross-rail of the frame 29, while the rear ends of said corrugated bars 33 are attached to the frame 29 and extended rearwardly therefrom to form the delivery-fingers 34. The teeth 32 of the rear endless conveyer 27 pass through the spaces between the corrugated bars 33, fixed on the conveyer-frame 29, and said corrugated bars serve in relation to the conveyer 27 the same purpose as the corrugated bars 24 serve to the conveyer 18—that is to say, the bars 33 support the straw and chaff as they are carried by the conveyer 27 to the delivery-fingers 34. The space between the delivery end of the front shaking-separator and conveyer 18 and the receiving end of the rear conveyer 27 is practically closed against the passage of straw and chaff by means of the series of detaining-fingers 35, attached rigidly to the front cross-rail of the conveyer-frame 29 and extending upwardly toward the driving-roller of the front conveyer 18, and said lower front end of the conveyer-frame 29 carries a series of downwardly-curved guard-fingers 35ª, which extend beneath the conveyer 27 and lie adjacent to the intermediate longitudinal conveyer 50, said guard-fingers 35ª serving to catch and detain any straw which may be lodged upon said conveyer 50, and thereby reduce to a minimum the return of straw and chaff by the conveyer 50 to the front end of the machine.

The shaft 19 of the front endless conveyer 18 is equipped at one end with a driving-pulley 36, adapted to be driven, in a manner presently described, from the counter-shaft that actuates the lower grain-board of the machine, and the other end of said shaft 19 has a belt-pulley 37, around which passes a belt 39, that extends to and around the belt-pulley 38 on the shaft 28 of the rear endless conveyer 27, whereby the shafts 19 28 of the two conveyers 18 27 are operatively connected together to have the rear conveyer 27 driven by the shaft of the front endless conveyer 17.

The final element of the upper shaking-separator and conveyer system of my improved machine is the finger-shaft 40, which is arranged in rear of the driving-shaft 28 for the rear endless conveyer 27, said finger-shaft being journaled in suitable bearings 41, attached to the frame or casing 1 on a plane below the shaft 28. This finger-shaft carries two series of fingers 42 43, which are suitably attached thereto. The series of fingers 42 are arranged to project beyond the front side of the finger-shaft 40 and extend below the driving-shaft 28 of the inclined rear conveyer 27. The rear series of fingers 43 extend in inclined directions from the finger-shaft 40, and the rear terminals of said fingers 43 are adjacent to the rear delivery end of the second intermediate conveyer 50 of the threshing-machine. The fingers 34 at the rear delivery end of the rear endless conveyer 27 extend downwardly and over the finger-shaft 40, and thus the front series of fingers 42 of said shaft 40 and the rear delivery fingers 34 of the frame 29 for the endless conveyer 27 are arranged to overlap each other in a manner to effectually prevent the straw and chaff from passing down to the intermediate second conveyer 50 of the machine. This finger-shaft 40 is positively rocked or oscillated by connections with the operating parts of the machine for the purpose of vibrating the two series of fingers 42 43 thereon, and thereby give to the straw and chaff a vibrating or shaking motion to free the loose grain therefrom prior to its delivery from the machine, and in the preferred embodiment of the machine for rocking or oscillating this finger-shaft I employ an arm 44, a crank-disk 45, and a link 46. The crank-disk 45 is rigidly attached to one end of the shaft 28, that drives the rear endless conveyer 27, and to a suitable wrist-pin on this disk 45 is attached the front end of the link 46. The arm 44 is rigidly attached to the finger-shaft 40, and to the upper end of this rocking arm 44 is pivotally connected the rear end of the link or pitman 46, thereby operatively connecting the finger-shaft 40 with the rear driving-shaft 28 of the rear endless conveyer 27.

From the foregoing description, taken in connection with the drawings, it will be seen that the conveyers 18 27 and the finger-shaft, which constitute elements of the upper shaking-separator and conveyer system of the threshing-machine, are so constructed as to sustain the straw as it is moved by the conveyers and fingers through the machine, and at the same time the conveyers and fingers are constructed to permit of the passage through the same of any grain which is loosened from the straw or chaff by the agitation or vibration imparted to such straw in its travel over the corrugated bars and the fingers of such upper conveying system. The described construction of the conveyers and fingers of the upper conveyer system permits the grain to pass freely to the intermediate second conveyer 50 of the machine, and this second conveyer is adapted to travel in a reverse direction to the line of travel of the straw under the influence of the members of the upper conveyer system. Said upper shaking-separator and conveyer system operates to carry the straw and chaff from the threshing-cylinder rearwardly to the delivery end of the machine, but the second intermediate conveyer travels from rear to front of the machine for the purpose of conveying the grain loosened by and deposited from the upper shaking-separator and conveyer system onto the second or intermediate conveyer back to the third or lower shaking-separator and conveyer system and into the path of the blast of air from the primary fan of the machine.

The second or intermediate conveyer 50 lies immediately below and in close relation to the conveyers 18 27 and the finger-shaft of the upper conveyer system, and said second or intermediate conveyer 50 extends continuously from the rear end of the machine to a point in advance of the slotted rear end 9 of the straw-board or rack 7. Said second or intermediate conveyer 50 consists of endless belts or chains and a series of cross-slats 56, provided with the teeth 57, and said conveyer 50 operates in connection with a fixed grain-board 58, which conforms to the longitudinal contour of the conveyer 50 and is suitably supported within the main frame or casing 1 to receive the grain as it drops through the members of the upper conveyer system. The front end of the long intermediate second conveyer 50 passes around and is sustained by a roller 51ª on the driving-shaft 51, while the rear end of said endless intermediate second conveyer is supported by an idler-roller 54. The front driving-shaft 51 is journaled in suitable bearings 52, attached to the main frame or casing below the slotted delivery end of the strawboard 7, and to one end of this shaft 51 is attached a driving-pulley 54. The rear idler-roller and shaft are supported in bearings 55 on the machine-frame 1 at the delivery end thereof, and the long second conveyer 50 is sustained at intervals throughout its length by a series of idler-rolls for the purpose of keeping the conveyer belts or chains taut and in proper relation to the grain-board 58. One of these intermediate idler-rollers is indicated at 59 to lie in the plane of the grain-board 58, said roller 59 being journaled in suitable bearings on the main frame and working in a slot or opening in the grain-board 58. Another idler-roller 61 is journaled in bearings 62 on the main frame at a point adjacent to the driving roller and shaft 51, and other idler-rollers 63 are likewise journaled in bearings on the main frame to engage with the chains or belts of the conveyer 50 at a point adjacent to the roller 59 and to properly direct the conveyer to pass beneath said roller 59 and out of the path of the toothed bars on the lower vibrating conveyer 65. This vibrating separator and conveyer 65 is the third or final conveyer arranged longitudinally in the machine in accordance with my invention, and said conveyer 65 is arranged beneath a part of the grain-board 58 and the front part of the endless second or intermediate conveyer 50. The vibrating lower separator and conveyer 65 is arranged in an inclined position longitudinally within the machine and its lower front end lies below the slotted delivery end of the vibrating straw board or rack 7, while the rear delivery end of said separator and conveyer 65 is arranged to overhang the reciprocating shoe. This lower inclined vibrating separator and conveyer 65 consists of a frame 65ª, a series of cross-slats 72, and a series of longitudinal corrugated bars or rods 73. The cross-slats 72 are attached rigidly to the frame 65ª, and they are spaced at suitable distances from each other to permit the grain to pass through the same onto the lower vibrating grain-board 75, and the bars or rods 73, forming a part of said lower vibrating conveyer 65, are attached rigidly to the end rails of the frame 65ª and to the cross-slats 72. The longitudinal rods or bars 73 are corrugated to present the roughened or irregular working surface for the lodgment of any straw or chaff which may pass from the upper shaking-separator and conveyer system and be carried back by the intermediate conveyer 50. As this frame 65ª of the lower conveyer is positively vibrated by suitable connections with the machine, the straw and chaff are subjected to a violent agitation as they travel over the working surface of the conveyer 65.

It will be observed that the idler-roller 61 for the intermediate second conveyer is arranged close to the working surface of the lower vibrating conveyer 65, and as the lower strands of the endless belts or chains of the second conveyer 50 are driven in a direction from front to rear of the machine the toothed bars or slats of said conveyer 50 are caused to coact with the vibrating conveyer 65 to carry the straw and chaff rearwardly through the machine. The lower vibrating separator and conveyer 65 is suspended in the machine-casing to enable said separator and conveyer to reciprocate or vibrate therein, and the front end of said conveyer-frame 65ª is connected with a cranked rock-shaft 66, journaled in bearings 67 on the frame 1, said rock-shaft 66 having the arms 68, to which are connected links or pitmen that lead to the shaft of the primary fan or blower, presently referred to. The rear end of the frame 65ª, forming a part of the vibrating separator and conveyer 65, is hung by means of a cranked rock-shaft 69, which is journaled in bearings 70, suitably attached to the delivery end of said separator and conveyer 65, and has its arms 71 journaled in the bearings 70ª on the frame or casing 1.

Below the vibrating separator and conveyer 65, which receives and detains the straw and chaff that may pass to the lower part of the threshing-machine, is arranged the inclined vibrating grain-board 75. This inclined grain-board 75 is hung or suspended within the machine frame or casing to partake of the inclination of the lower vibrating separator and conveyer 65, and said vibrating grain-board 75 is adapted to receive the grain which may pass through the separator and conveyer 65 and deliver said grain to the cleaning-shoe. Said grain-board 75 is constructed with a series of triangular slats 76, which are fastened to a suitable frame in close relation to or in actual contact with each other, and said slats impart to the main board a step-shaped working surface adapted to receive and retain the grain which may be deposited thereon. The front end of the vibrating grain-board 75 is hung or suspended by means of a crank-shaft 77, connected to the frame of said grain-board and having its arms 78 journaled in bearings 79 at the lower sill of the frame or casing 1, and the rear end of the said vibrating grain-board 75 is suspended by the shaft 80, having its cranks 81 journaled in the bearings 82.

The primary fan or blast-fan is indicated at 83, and it is arranged beneath the straw board or rack 7 and in advance of the lower separator and conveyer 65 and the grain-board 75. The shaft 84 of this primary fan is journaled in suitable bearings on the main frame, and one end of this shaft is extended beyond the machine-casing to receive a double pulley 85, one member of which receives a belt 86, that extends to and around the pulley 6ᵇ on the beater-shaft 6ª, whereby the rotary beater 6 is operated by belt connections with the primary fan.

The shaft 14, that operates to vibrate the straw board or rack 7, is provided on the side of the machine adjacent to the pulleys 2ᵇ with a double pulley 87, and from one member of this double pulley 87 extends a belt 88, which runs to the member of the pulley 85 to rotate the fan and its shaft, thus causing the shaft to be positively driven from the shaft 14, that operates the straw board or rack 7.

The lower vibrating separator and conveyer 65 of the machine is driven by connections with the shaft of the primary fan, and to this end I provide the fan-shaft 84 with the eccentrics 89, that receive the yokes of the pitmen 90, which have their other ends attached to the crank-arms 68 on the rock-shaft 66, that sustains the front end of the lower vibrating separator and conveyer 65. It will thus be seen that the fan-shaft of the primary fan is driven from the shaft that operates the straw board or rack and that said fan-shaft in turn drives the rotary beater and imparts the vibrating motion to the lower separator and conveyer 65.

The lower grain-board 75 is driven by means of a counter-shaft 91, which is journaled in bearings on the machine-frame between the front and rear shafts that sustain said grain-board within the machine, and this counter-shaft 91 is provided with cranks $91^a$, to which are attached links or rods that lead to the front end of the grain-board 75, thus operatively connecting the board with the counter-shaft for driving said grain-board as required. One end of this counter-shaft 91 is equipped with a large pulley 92 and with a smaller pulley 93, and the other end of said counter-shaft 91 has a large pulley 108 attached thereto for a purpose which will presently appear.

Figure 1:
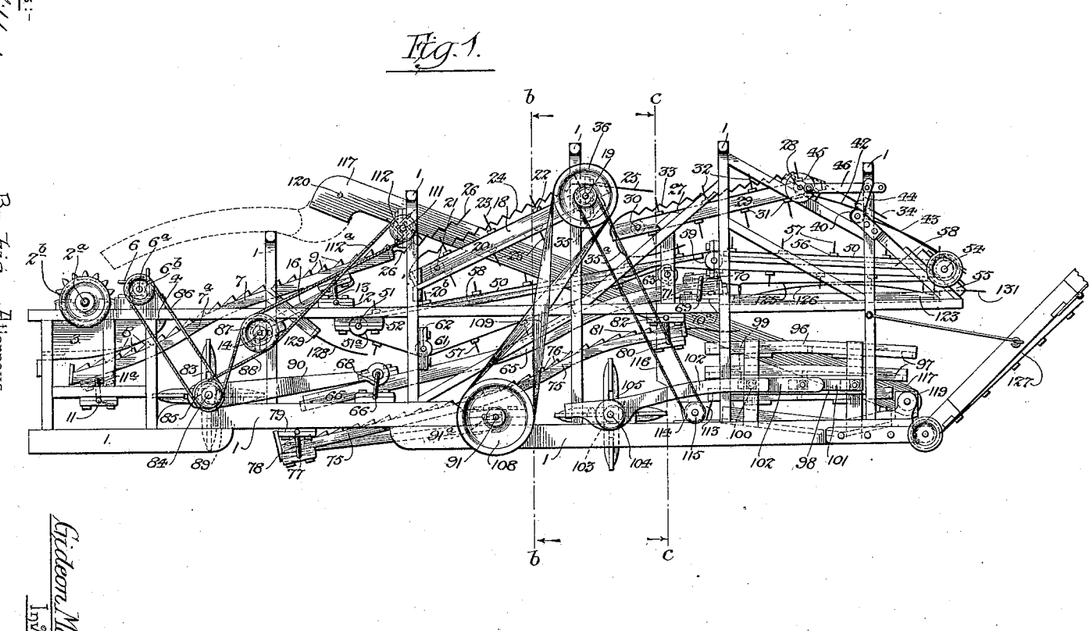
Figure 1 is an elevation looking at one side of the improved threshing-machine with the frame or casing thereof skeletonized.
Figure 2:
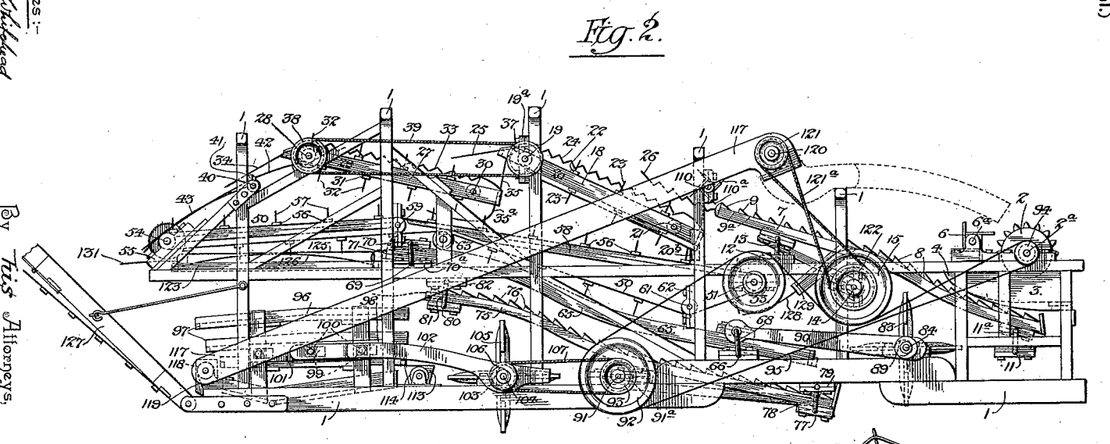
Fig. 2 is an elevation looking at the opposite side of the machine, likewise with the frame or casing skeletonized.
Figure 3:
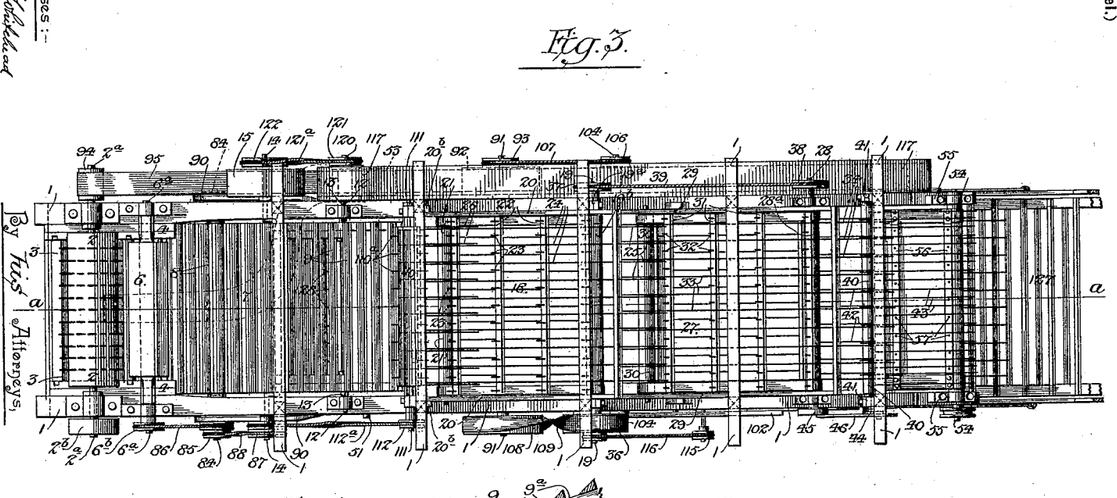
Fig. 3 is a plan view of the parts shown by Figs. 1 and 2.

The shaft of the threshing-cylinder is provided at its end opposite to the driving-pulley with a pulley 94, that propels a long belt 95 to drive the pulley 92 on the counter-shaft 91, the pulley 53 of the shaft that propels the long intermediate conveyer 50, and the pulley 15 of the shaft 14 that vibrates the straw board or rack 7. By reference to Fig. 2 it will be seen that this long belt 95 passes directly to and around the pulley 94 to the pulley 92, thence over the pulley 53, thence under the pulley 15, and back to the pulley 94, whereby the several shafts are positively driven by a single belt connection with the threshing-cylinder.

The cleaning-shoe of my machine is indicated at 96, and in the embodiment of this shoe it is arranged to partake of a reciprocating movement or play in a horizontal plane lengthwise of the machine in contradistinction to a transverse vibrating movement or play ordinarily given to the shoes of threshing-machines. This cleaning-shoe comprises a suitable frame or casing and a series of sieves or riddles 97, and said frame or casing of the shoe is supported and guided within the machine-casing by means of slotted bars 98. These slotted bars or rails are fixed to the casing or frame 1 in horizontal positions and upon the sides of the same, and said bars or rails have the longitudinal slots 99 to receive the guide-arms 100, which are attached rigidly to the frame or casing of said cleaning-shoe. I preferably employ guide-arms arranged in pairs on opposite sides of the shoe casing or frame, and each pair of arms are joined together by means of the rails 101, which are fixed in a suitable way to the arms 100. The guide-arms 100 are loosely fitted in the slotted guide bars or rails to support the cleaning-shoe within the main frame or casing 1 and to direct said shoe in a horizontal path when it is vibrated. To the connecting-rails 101 of the cleaning-shoe are pivotally attached the rear ends of the pitmen 102, which lead to and are fitted on the eccentrics 103 on the shaft 104 of the shoe-fan 105. The cleaning-shoe is arranged in the frame or casing at the delivery end thereof and below the conveyer 27 and finger-shaft 40 of the upper conveyer system, and to this cleaning-shoe is arranged to deliver the rear end of the vibrating grain-board 75. The shoe-fan 105 is arranged in advance of the shoe 96 to deliver its blast directly to the sieves or riddles therein, and to one end of this fan-shaft 104 is attached a pulley 106, that receives the belt 107, driven from the member 93 of the double pulley on the counter-shaft 91. It will thus be seen that the fan-shaft is belted directly to the counter-shaft to be rotated or driven thereby, and said fan-shaft is operatively connected by the pitman to the reciprocating shoe to actuate the latter.

The pulley 108, which is attached to one end of the counter-shaft 91, is connected by a belt 109 to the pulley 36 on the driving-shaft 19 of the front shaking separator and conveyer 18, forming a part of the upper conveyer system, and this shaft 19 operates through the pulleys 37 and 38 and the belt 39 to drive the shaft of the rear conveyer 27.

In connection with the series of fingers 26 at the delivery end of the straw board or rack 7 I employ a toothed deflector-cylinder 110, arranged to beat the straw and chaff as they pass from the straw-rack to the front conveyer 18, and said deflecting-cylinder is operatively connected with one of the shafts of the machine to be rotated or driven positively thereby. The deflecting-cylinder 110 is arranged immediately above the series of fingers 26, and it is provided with a series of teeth $110^a$, which are suitably fastened to blades or wings on said deflecting-cylinder. This cylinder 110 has its shaft 111 journaled in bearings on the frame 1, and one end of said shaft has a pulley 112, around which passes a cross-belt $112^a$, that extends to and around the pulley 87 on the shaft 14 that drives the straw rack or board 7.

The cleaned grain from the final riddle or sieve of the reciprocating cleaning-shoe 96 is delivered into a trough 113, arranged on the frame or casing 1 below said final sieve of the shoe, and in this trough operates a screw conveyer 114, the shaft of which is provided at one end with a pulley 115, that is driven by a belt 116 from a member of the double pulley 36, attached to the end of the shaft 19 for the front conveyer 18.

The tailings from the cleaning-shoe are delivered by said shoe and the blast from the fan 105 to a return-trough 119, suitably supported transversely across the machine in rear of the shoe 96, and in this return-trough operates a screw conveyer 118, that delivers to the belt-elevator 117, one end of the screw conveyer-shaft being fitted operatively to the elevator-belt to be driven thereby. The return-elevator 117 is arranged on the outside of the machine-casing 1 to extend from the return-conveyer 118 to a suitable point adjacent to the threshing-cylinder, and from this return-elevator leads a spout or chute which conducts the tailings back to the cylinder in an ordinary manner familiar to those skilled in the art. The upper shaft 120 of the return-elevator has a pulley 121, which is driven by a belt 121$^a$, that passes around a pulley 122 on the shaft 14, said pulley 122 being adjacent to the pulley 15, that is driven by the belt 95.

In connection with the vibrating lower separator and conveyer 65 of the machine I employ a stationary straw-rack 123, which is supported within the machine-casing over the cleaning-shoe 96. The stationary straw-rack 123 has its frame attached to the main frame in a suitable manner, and said straw-rack has two series of bars 125 126, which are rigidly fastened to the frame of said straw-rack. The upper series of bars 125 are arranged in alternate relation to the lower series of bars 126 of said rack, and said bars are adapted to receive the straw and chaff which are delivered from the conveyers 65 50. The straw deposited on the conveyer 65 is carried along the same by the vibrating motion imparted thereto in the manner described and by the action of the lower strand of the conveyer 50, and said straw-rack 123 is in line with the delivery end of the lower separator and conveyer 65, so that it occupies a parallel position with relation to the lower side of the conveyer 50, whereby the toothed bars on said conveyer 50 are adapted to carry the straw along the rack 123, over the cleaning-shoe 96, and thereby deliver the straw to the stacker.

The stacker is indicated at 127, and it is suitably supported on the delivery end of the threshing-machine. This stacker is of ordinary construction familiar to those skilled in the art and it is designed to be driven by power connections with the rear shafts of the threshing-machine.

To prevent the straw and chaff which may pass through the slotted delivery end of the straw-rack 7 and the front end of the intermediate conveyer 50 from passing to the fan 83 I provide a series of deflecting-fingers 128, which are attached to a cross-rail 129, suitably fixed to the main frame below the straw-rack 7. These detaining-fingers 128 are arranged in inclined positions downwardly and rearwardly with relation to the primary fan 83 and said fingers serve to deflect the straw or chaff which may be deposited thereon onto the lower separator and conveyer 65 of the machine.

This being the construction of my improved machine, the operation may be described as follows: The threshing-cylinder is driven by a suitable belt from a traction-engine or other source of power, and from the pulley 94 on the threshing-cylinder shaft is driven the counter-shaft 91, which, in connection with the described gearing or belt connections, operates all the working elements of the machine. The straw-rack 7, the conveyers 18 27, and the finger-shaft are moved to carry the straw and chaff from the cylinder to the delivery end of the machine; but the intermediate conveyer 50 is driven in a direction to travel from rear to front, thus impelling said conveyer 50 in a reverse direction to the line of travel of the members of the upper shaking-separator and conveyer system. The lower separator and conveyer 65 on the vibrating grain-board 75 is driven to convey the straw and chaff and the grain respectively from front to rear of the machine, and the lower grain-board 75 delivers the grain to the reciprocating shoe 96, while the lower strand of the conveyer 50 operates to carry the straw along said conveyer 65 and the straw-rack 123 to deliver the latter to the stacker. As the straw passes over the straw rack or board 7, the conveyers 18 27, and the rocking finger-shaft the straw is agitated and the grain loosened therefrom. The loosened grain flows through the slots or openings in the straw board or rack 7, the conveyers, and the finger-shaft upon the grain-board 58, and any grain deposited on said grain-board is swept or carried by the conveyer 50 from rear to front of the machine and delivered upon the lower separator and conveyer 65 and the vibrating grain-board 75. As the grain passes from the slotted part of the straw-rack and the conveyer 50 it is subjected to the blast of air from the primary winnower or fan, and the lower separator and conveyer 65 operates to detain the major portion of the fine straws or chaff, while the grain passes through said separator and conveyer 65 and lodges upon the grain-board 75. As before described, the fine straws and chaff on the separator and conveyer 65 are carried by the conveyer 50 across the straw-rack and to the stacker, while the grain from the board 75 is delivered directly to the cleaning-shoe 96. In this shoe the grain is subjected to the action of the riddles or sieves and exposed to the blast of air from the shoe-fan 105. The fine straw and chaff are blown by the fan from the shoe out through the rear end of the machine, the cleaned grain is delivered to the trough 113, while the tailings are delivered from said shoe into the return-trough 119, to be delivered to the return-elevator 117, which carries the tailings back to the threshing-cylinder.

Figure 4:
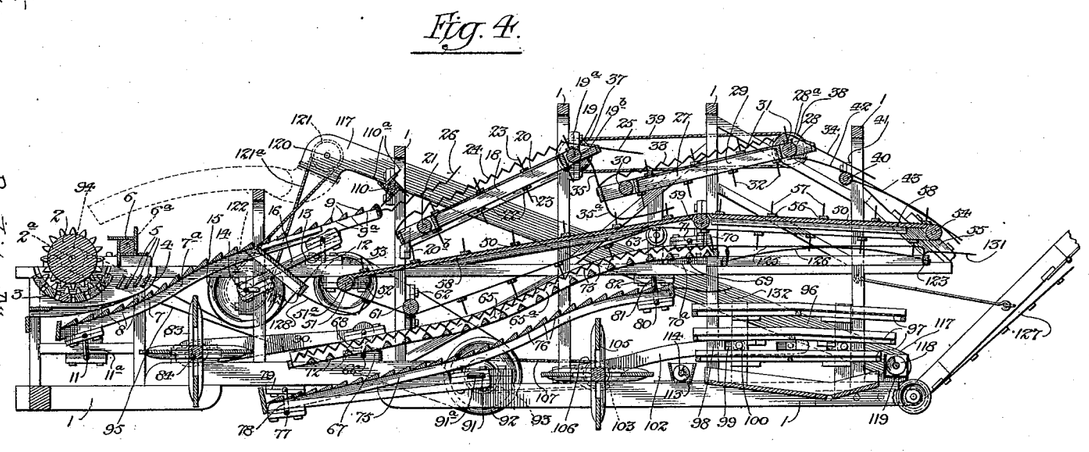
Fig. 4 is a vertical longitudinal sectional view through the entire machine on the plane indicated by the dotted line *a a* of Fig. 3.
Figure 5:
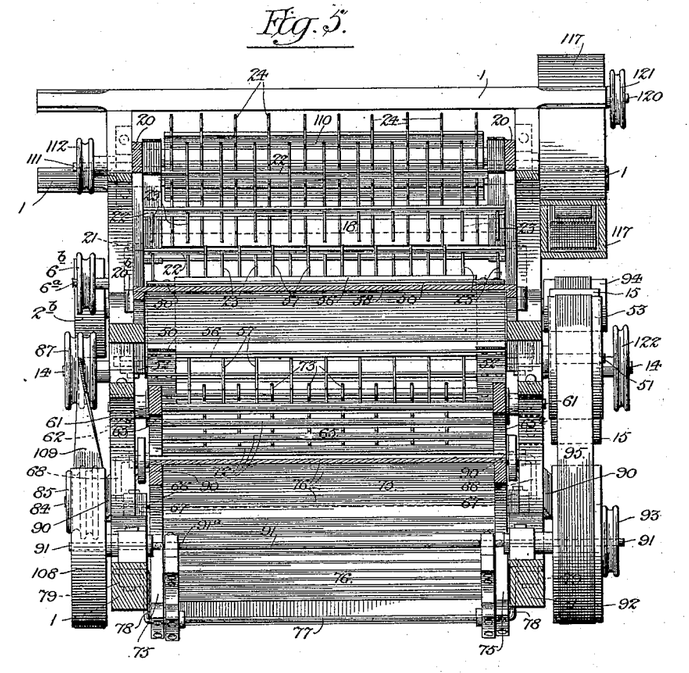
Fig. 5 is a vertical transverse sectional view on the plane indicated by the dotted line *b b* of Fig. 1 looking in the direction indicated by the arrow.
Figure 6:
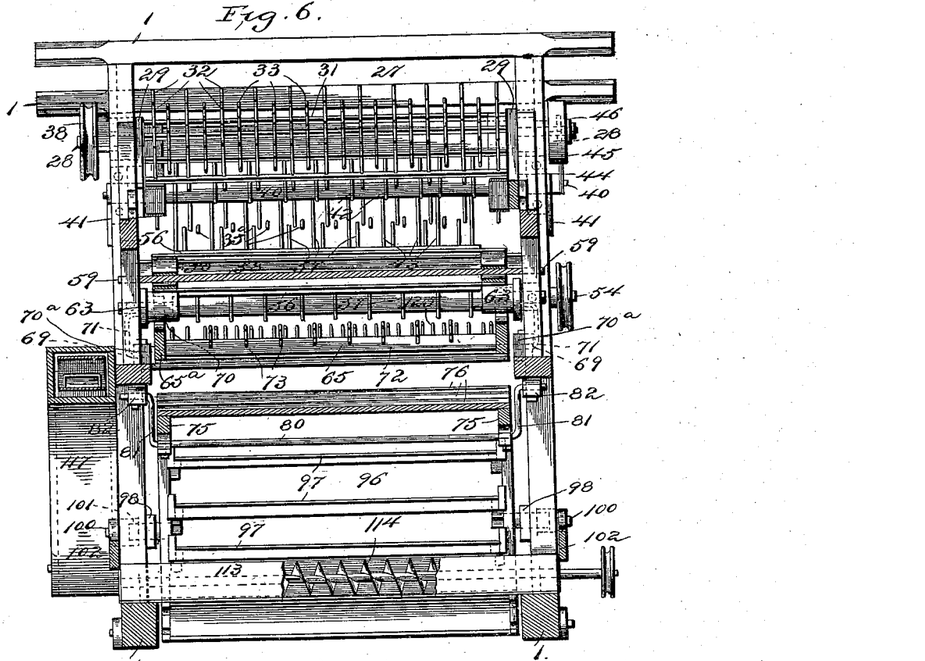
Fig. 6 is a similar view in transverse section, but taken on the plane indicated by the dotted line *c c* of Fig. 1 looking in the direction indicated by the arrow.
Figure 7:
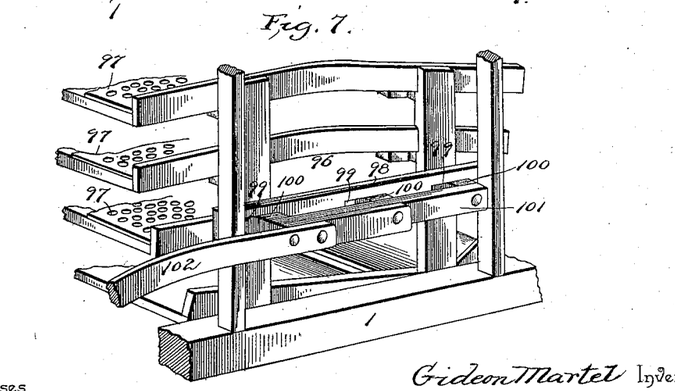
Fig. 7 is a detail view of the shaking-shoe with its frame or casing skeletonized and showing means for guiding and reciprocating said shoe.
Figure 8:
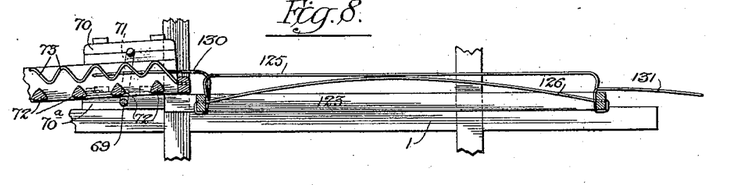
Fig. 8 is a vertical section of the straw-rack over the cleaning-shoe.
Figure 9:
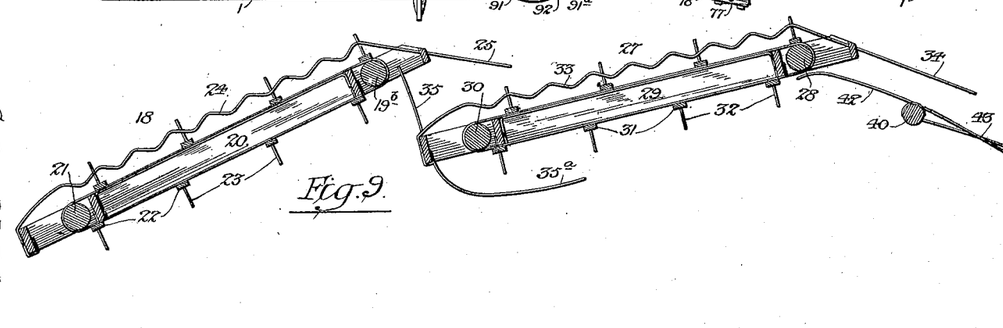
Fig. 9 is an enlarged fragmentary sectional view through the front and rear conveyers and the finger for forming in part the upper conveyer system from the threshing-cylinder to the delivery end of the machine.
Figure 10:
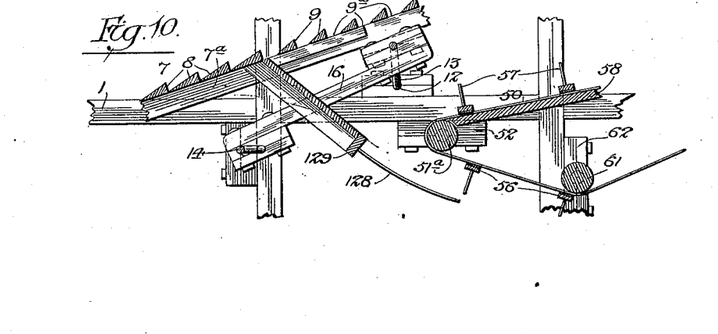
Fig. 10 is an enlarged fragmentary sectional view showing in part the vibrating straw-rack, a part of the intermediate or second endless conveyer, and the inclined fixed deflector-fingers in advance of said conveyer and below the straw-rack.
Figure 11:
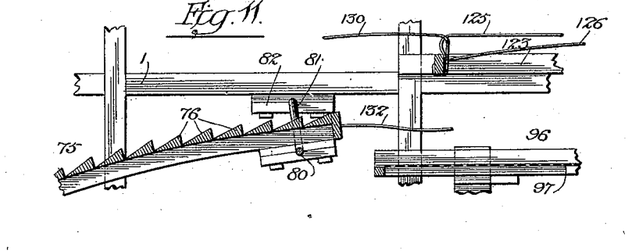
Fig. 11 is an enlarged fragmentary sectional view showing the rear end of the lowermost vibrating grain-board, a part of one of the riddles of the cleaning-shoe, and a part of the stationary straw-rack.

In the detail view, Fig. 11, and in Fig. 4 I have shown the straw-rack provided with a series of forwardly-projecting fingers 130, which are adapted to project over the rear delivery end of the lower vibrating conveyer to insure the passage of straw across the space between the lower conveyer 65 and the straw-rack 123, and at its rear end said rack 123 is also provided with the projecting fingers 131 (see Fig. 8) to insure the delivery of the straw to the stacker. The rear delivery end of the vibrating grain-board 75 is provided with the series of rearwardly-projecting fingers 132, adapted to the passage of straw and chaff to the riddles of the cleaning-shoe on the forward movement of the grain-board. (See Fig. 11.)

I am aware that changes in the form and proportion of parts and in the details of construction may be made by a skilled mechanic without departing from the spirit or sacrificing the advantages of my invention, and I therefore reserve the right to make such modifications as clearly fall within the scope of the invention.

What I claim is—

1. In a threshing-machine, the combination with a cylinder and an upper separator and conveyer system, of a lower separator and conveyer, an endless toothed conveyer located below the upper separator and conveyer system and arranged to deliver grain to the lower separator and conveyer, a vibrating grain-board situated below the lower separator and conveyer, a primary blast-fan in advance of said lower separator and conveyer and the vibrating grain-board, a cleaning-shoe situated in rear of the vibrating grain-board and below the delivery end thereof, and a straw-rack supported between the horizontal planes of said shoe and the endless toothed conveyer and lying contiguous to, and in the plane of the delivery end of, the lower separator and conveyer, all arranged and adapted substantially as and for the purposes set forth.

2. In a threshing-machine, the combination with a cylinder, and an upper separator and conveyer system for carrying the straw rearwardly to the delivery end of the machine, a lower separator and conveyer, a cleaning-shoe situated below and in rear of said lower separator and conveyer, an endless toothed conveyer mechanism arranged below the upper separator and conveyer system and driven for its upper lead to travel in a reverse direction to the travel of the upper separator and conveyer system, the lower lead of said endless toothed conveyer arranged to sweep in close relation to the lower separator and conveyer, a vibrating grain-board below the lower separator and conveyer and having its rear end arranged to deliver grain to the shoe, a straw-rack arranged above the shoe and in the plane of the delivery end of said lower separator and conveyer, and a shoe-fan below the rear part of the grain-board and in advance of said shoe, substantially as described.

3. In a threshing-machine, the combination with a cylinder, of an upper separator and conveyer system operable for carrying the straw rearwardly through the machine, a primary fan adjacent to the threshing-cylinder at the front end of the machine, a cleaning-shoe at the rear end of the machine and below the plane of the upper separator and conveyer system, a lower separator and conveyer arranged in an inclined position between said primary fan and the cleaning-shoe, a vibrating grain-board arranged below the lower separator and conveyer and having its rear end arranged to discharge grain to the shoe, a shoe-fan, and an endless conveyer mechanism supported between the upper separator and conveyer system and the lower separator and conveyer, the front end of said endless conveyer being arranged to overhang the front part of the lower separator and conveyer, said endless conveyer being driven for its upper strand to travel reversely to the upper separator and conveyer system and for its lower strand to sweep into close relation to the lower separator and conveyer, substantially as described.

4. In a threshing-machine, the combination with a cylinder, and an upper separator and conveyer system, of a lower separator and conveyer, an endless toothed conveyer mechanism arranged below said upper separator and conveyer system and driven for its upper lead to travel in a reverse direction to said upper separator and conveyer system, the front part of said endless toothed conveyer terminating in rear of the corresponding part of the lower separator and conveyer, and the lower lead of said endless conveyer guided to travel in close relation to the lower separator and conveyer, a vibrating grain-board below the separator and conveyer, with its rear end arranged to overhang the cleaning-shoe, a primary fan situated in advance of the lower separator and conveyer and said vibrating grain-board to direct a blast over the same, a straw-rack in the plane of the delivery end of said lower separator and conveyer, and a shoe under the delivery end of the grain-board and below the straw-rack, substantially as described.

5. In a threshing-machine, the combination with a threshing-cylinder, of an upper shaking-separator and conveyer system, a lower separator and conveyer, a cleaning-shoe, a straw-rack supported above said cleaning-shoe and arranged to receive the straw and chaff from the lower separator and conveyer, and an intermediate conveyer mechanism arranged to carry the grain from the upper shaking-separator and conveyer system to the lower separator and conveyer and to sweep in close relation to said lower separator and conveyer and the straw-rack, substantially as and for the purposes described.

6. In a threshing-machine, the combination with a threshing-cylinder, of an upper shaking-separator and conveyer system, a shoe, a primary blast-fan, a lower separator and conveyer between said primary fan and the shoe, a straw-rack supported above the shoe and in alinement with the lower separator and conveyer, and an intermediate conveyer mechanism below the upper shaking-separator and conveyer system and having its lower part arranged to sweep in close relation to the lower separator and conveyer and the straw-rack, substantially as and for the purposes described.

7. In a threshing-machine, the combination with a threshing-cylinder, of a vibrating straw-rack having its receiving end below said threshing-cylinder, a series of conveyers arranged one in rear of the other and with the front conveyer arranged to receive from said straw-rack, and a rocking finger-bar situated in rear of the final conveyer and having two series of fingers, one series of fingers terminating below the final conveyer and the other series of fingers delivering the straw through the rear end of the machine, substantially as and for the purposes described.

8. In a threshing-machine, the combination with a cylinder and its concave, of a vibrating straw-rack provided with a closed step-shaped front end and with a series of slats arranged to form a series of slots or openings at the rear end, said straw-rack being arranged in an inclined position for its rear slotted end to lie above the horizontal plane of the cylinder, means for reciprocating the straw-rack, a series of inclined conveyer-frames arranged one in rear of the other, in overlapping order, and with the first conveyer-frame below the rear end of the vibrating rack, a series of straw-bars attached to each conveyer-frame, and an endless traveling conveyer supported in each frame below the straw-bars thereof, substantially as described.

9. In a threshing-machine, the combination with a cylinder, and a lower separator and conveyer mechanism arranged below the horizontal plane of the cylinder-concave, of an upper separator and conveyer system arranged to carry the straw continuously from the cylinder to the rear end of the machine, said system including an inclined straw-rack suspended for its front end to lie below the concave, a series of conveyer-frames arranged in inclined overlapping relation one to the other and to the straw-rack, a series of straw bars or rods supported by each conveyer-frame, a series of endless conveyers supported individually by said frames and each conveyer having fingered slats arranged for the fingers thereof to sweep between the straw bars or rods on said frames, and means for vibrating the straw-rack and for propelling the endless conveyers, substantially as described.

10. In a threshing-machine, the combination with a concave, a cylinder, the slats, 5, in rear of said concave, and a beater over said slats, of an inclined straw-rack, 7, hung for its lower end to lie below the concave and provided with the closed slats, 8, and the spaced slats, 9, the corrugated yieldable separating-fingers, 26, fixed to the free rear end of the rack, 7, and extending rearwardly therefrom, a revoluble deflecting-cylinder, 110, journaled on the machine-frame directly over said yieldable fingers, 26, and arranged to sweep close thereto for vibrating the same, an inclined conveyer-frame supported in rear of said straw-rack and having the straw-bars arranged with their front ends below said yieldable fingers, and a toothed conveyer supported in said frame for its teeth to sweep between said straw-bars, substantially as described.

11. In a threshing-machine, the combination with a cylinder, a lower separator and conveyer, a shoe, and an inclined vibrating grain-board hung below the lower separator and conveyer and arranged to deliver grain to the shoe, of an upper conveyer system arranged in the horizontal plane of the cylinder and above said shoe to carry the straw continuously through the machine, said conveyer system comprising an inclined vibrating straw-rack having its front end arranged below the cylinder and its rear end above the horizontal plane of the cylinder, a series of inclined conveyer-frames arranged in overlapping order for the delivery end of one frame to overhang the receiving end of an adjacent frame, the series of straw-carrying bars or rods supported by each frame and extended at the rear ends to form the inclined delivery-fingers, a series of endless conveyers supported individually by the frames and having the fingers arranged to sweep through the bars or rods on said frames, and a rocking finger-bar situated at the rear end of the machine and having the fingers arranged to project below the delivery-fingers of the final frame, substantially as described.

12. In a threshing-machine, the combination with a cylinder, a lower separator and conveyer, a cleaning-shoe, a vibrating grain-board, and an endless toothed conveyer above the lower separator and conveyer, of an upper separator and conveyer system arranged to carry the straw from the cylinder continuously to the rear end of the machine, said conveyer system comprising a vibrating straw-rack, a series of endless conveyers arranged in inclined relation and in juxtaposition one to the other and to the straw-rack, and a positively-vibrated finger bar or shaft in rear of the final conveyer and having two series of fingers which project in opposite directions therefrom, one series of fingers extending toward the delivery end of the final conveyer, substantially as described.

13. In a threshing-machine, the combination with a threshing-cylinder, of a vibrating straw board or rack, an inclined conveyer having its frame provided with a plurality of longitudinal corrugated bars which terminate at their rear ends in a series of inclined delivery-fingers, another conveyer with its receiving end below the fingers of the first-named conveyer and likewise provided on its frame with a plurality of corrugated bars terminating at their rear ends in another series of fingers, and a rock-shaft provided with two series of fingers, one series of which extend below the delivery-fingers of the last-named conveyer and the other series of which project to the rear delivery end of the machine, substantially as and for the purposes described.

14. In a threshing-machine, the combination with a threshing-cylinder, of an inclined vibrating straw-rack, a conveyer inclined in relation to said straw-rack and having its frame provided with a series of corrugated bars or rods extended at their rear ends beyond said frame, and a rocking finger-shaft below the fingers of said conveyer, substantially as and for the purposes described.

15. In a threshing-machine, the combination with a threshing-cylinder, and a vibrating straw rack or board, of an inclined conveyer having its frame provided with a series of straw-carrying rods or bars and the inclined delivery-fingers, a rocking finger-shaft provided with two series of fingers, and positive connections between a conveyer-driving shaft and said rocking finger-shaft to vibrate the latter, substantially as and for the purposes described.

16. In a threshing-machine, the combination with a cylinder, and a vibrating rack of the upper separator and conveyer system including a series of frames arranged in overlapping order and each frame provided with a series of straw-bars and also provided with an endless conveyer, the final frame of said system being further provided with the downwardly-extending straw-detaining fingers, an endless toothed conveyer below the separator and conveyer system and arranged for its teeth to sweep through the spaces between said detaining-fingers, a lower separator and conveyer in close relation to the lower strand of the endless conveyer and having its front end terminating in advance of the endless toothed conveyer, an inclined grain-board below the lower separator and conveyer, a straw-rack in the plane of the delivery end of said lower separator and conveyer, means for reciprocating the lower separator and conveyer, and a cleaning-shoe below the straw-rack and contiguous to the delivery end of the grain-board, substantially as described.

17. In a threshing-machine, the combination with a threshing-cylinder, and an upper separator and conveyer system, of an endless toothed conveyer arranged below said system and driven for its upper strand to travel in a reverse direction to the line of feed of said upper separator and conveyer system, an imperforate grain-board supported in a plane between the upper and lower strands of the endless conveyer and arranged in close relation to the upper strand of said conveyer for the latter to sweep the grain therefrom in a direction toward the front end of the machine, a vibrating lower separator and conveyer lying below the endless conveyer, and partly in advance of the front end thereof and of the grain-board, a straw-rack in the plane of the delivery end of the lower separator and conveyer, means for directing the lower lead or strand of the endless conveyer to sweep close to the lower separator and conveyer and the straw-rack, an inclined grain-board below the lower separator and conveyer, and a shoe, substantially as described.

18. In a threshing-machine, the combination with a threshing-cylinder, of a vibrating straw-rack, an inclined conveyer having its frame provided with the delivery-fingers, another conveyer inclined in rear of said first-named conveyer and likewise provided at its rear with a series of delivery-fingers, a series of upwardly-extending detaining-fingers supported on the last-named conveyer and terminating in advance of the delivery-fingers of the first-named conveyer, and a rocking finger-shaft in rear of the last-named conveyer, substantially as described.

19. In a threshing-machine, the combination with a threshing-cylinder, of an upper separator and conveyer system, a lower separator and conveyer, a straw-rack in the plane of the lower separator and conveyer, a grain-board above the lower separator and conveyer and the straw-rack, an endless toothed conveyer guided to travel around the grain-board, with the upper lead of said conveyer to sweep below the upper separator and conveyer system and with the teeth on its lower lead to sweep in close relation to the upper surface of the straw-rack and said lower separator and conveyer, a vibrating grain-board below the lower separator and conveyer, a primary fan in advance of said lower separator and conveyer and the endless toothed conveyer, a shoe below the straw-rack and contiguous to the grain-board, and a shoe-fan, substantially as described.

20. In a threshing-machine, the combination of an upper separator and conveyer system, an endless conveyer arranged below and traveling in an opposite direction to said separator and conveyer system, a shoe under the rear part of the endless conveyer, a shoe-fan in advance of said shoe, a vibrating lower separator and conveyer arranged in front of the shoe and partly in advance of the endless conveyer, said lower separator and conveyer lying close to the path of the lower strand of the endless conveyer and arranged to discharge straw and chaff through the rear end of the machine, a vibrating grain-board below the lower separator and conveyer and having at its rear end the delivery-fingers which overhang the cleaning-shoe, and a primary fan situated in front of the lower separator and conveyer and said vibrating grain-board, substantially as described.

21. In a threshing-machine, the combination with an upper shaking-separator and conveyer system, of an endless toothed conveyer propelled for its upper strand to travel in an opposite direction to the line of feed of said separator and conveyer system, a cleaning-shoe situated under the rear part of the endless conveyer, a straw-rack supported between the cleaning-shoe and the endless conveyer and arranged in such relation to said endless conveyer that the lower strand thereof may sweep close to said rack, the lower separator and conveyer arranged partly in advance of the endless conveyer, and delivering to the straw-rack, means for directing the lower strand of the endless conveyer to sweep close to the lower separator and conveyer, and an imperforate grain-board below said lower separator and conveyer and having at its rear end the fingers which overhang the cleaning-shoe, substantially as described.

22. In a threshing-machine, the combination with an upper shaking-separator and conveyer system, and a primary fan, of a cleaning-shoe in rear of said fan, a step-shaped imperforate grain-board hung in an inclined position between the fan and the shoe and having its delivery end adjacent to the shoe, an inclined, slotted separator and conveyer arranged above the grain-board and actuated independently thereof, and a stationary straw-rack arranged over the shoe and in line with the delivery end of the lower separator and conveyer, substantially as described.

23. In a threshing-machine, the combination with an upper shaking-separator and conveyer system and an intermediate conveyer, of a primary fan situated below and adjacent to the threshing-cylinder, a cleaning-shoe, a vibrating straw-rack arranged longitudinally of the machine in an inclined position and situated between the primary fan and the cleaning-shoe to deliver straw and chaff over the latter, a vibrating grain-board hung below the lower separator and conveyer and delivering directly to the cleaning-shoe, and mechanism substantially as described for operating said lower separator and conveyer and the grain-board.

24. In a threshing-machine, the combination with a threshing-cylinder, of an upper shaking-separator and conveyer system, an intermediate conveyer, a primary fan below and adjacent to the cylinder, a vibrating lower separator and conveyer hung in an inclined position in rear of the fan and extending below the intermediate conveyer, devices operatively connecting the lower separator and conveyer with shaft of the said fan, a cleaning-shoe below the delivery end of the lower separator and conveyer, and a vibrating grain-board below the lower separator and conveyer and overhanging the cleaning-shoe, substantially as described.

25. In a threshing-machine, the combination with an upper shaking-separator and conveyer system and an intermediate conveyer, of an inclined lower separator and conveyer hung at its ends for vibrating movement below the intermediate conveyer, a primary fan arranged in front of the lower separator and conveyer and having its shaft provided with the eccentrics to operate the separator and conveyer by positive connections with the fan-shaft, a cleaning-shoe, and a vibrating grain-board hung below the lower separator and conveyer and arranged to deliver to the cleaning-shoe, substantially as described.

26. In a threshing-machine, the combination with an upper shaking-separator and conveyer system, a cleaning-shoe, and a primary fan, of an inclined vibrating lower separator and conveyer hung between the cleaning-shoe and said primary fan, a plurality of corrugated bars carried by the lower separator and conveyer and forming an irregular working surface thereover for the passage of straw and chaff, a straw-rack disposed in the horizontal plane of the delivery end of said lower separator and conveyer, an endless toothed conveyer below the upper separator and conveyer system and having its lower lead guided for the teeth thereon to sweep between the bars of the lower separator and conveyer and said straw-rack and a vibrating grain-board suspended below the separator and conveyer and arranged to deliver to the shoe, substantially as described.

27. In a threshing-machine, the combination with an upper shaking-separator and conveyer system and a cleaning-shoe, of a lower separator and conveyor hung within the machine-casing to have its delivery end terminate over the cleaning-shoe, a stationary straw-rack provided with the series of fingers which overhang the lower conveyer, a primary fan, and a grain-board to deliver to the cleaning-shoe, substantially as and for the purposes described.

28. In a threshing-machine, the combination with a cylinder, and an upper separator and conveyer system, of a primary fan, an inclined lower separator and conveyer hung in rear of said primary fan and having operative connections with the fan-shaft to be vibrated thereby, a straw-rack supported in the plane of the delivery end of said lower separator and conveyer, an endless toothed conveyer below the upper separator and conveyer system, means for directing the lower lead of the endless conveyer to sweep close to the lower separator and conveyer and to the straw-rack, a primary shoe below the straw-rack, a shoe-fan having its shaft connected operatively to said shoe for reciprocating the latter, a grain-board below the lower separator and conveyer and with its rear end arranged to discharge to the shoe, and a counter-shaft having connections with the shoe-fan shaft and with the grain-board to actuate the same, substantially as described.

29. In a threshing-machine, the combination with a cylinder, of a vibrating straw-rack suspended below and extending in rear of said cylinder and having a slotted rear end, a lower separator and conveyer, a deflecting-board carried by the straw-rack and inclined downwardly toward the lower separator and conveyer, a series of conveyers arranged substantially in the horizontal plane of the straw-rack and coacting therewith to form the upper shaking-separator and conveyer system, an intermediate toothed conveyer, and a series of fingers supported by the deflecting-board and arranged to extend close to the path of the teeth on the intermediate conveyer, substantially as described.

30. In a threshing-machine, the combination with a cleaning-shoe, of an inclined separator and conveyer, a stationary straw-rack arranged in the horizontal plane of the delivery end of said separator and conveyer, an endless toothed conveyer arranged to sweep close to said straw-rack and the lower separator and conveyer to carry the straw thereover, a vibrating grain-board below said separator and conveyer, and fingers attached to the rear end of said grain-board to project over the shoe and span the space between the straw-rack and the separator and conveyer, substantially as described.

31. In a threshing-machine, the combination with a cleaning-shoe, and a grain-board arranged to have its rear end deliver to said shoe, of a vibrating separator and conveyer arranged over and extending in rear of the grain-board and carrying the series of corrugated bars, and a stationary straw-rack supported over the shoe and in the plane of the delivery end of the separator and conveyer, and forwardly-extending fingers attached to the straw-rack and projecting over the separator and conveyer and into the spaces between the corrugated bars thereof, substantially as described.

32. In a threshing-machine, the combination with a lower separator and conveyer, of a stationary straw-rack supported in a horizontal position in rear of the lower separator and conveyer, an inclined grain-board below the lower separator and conveyer, the horizontal fixed bearing-rails below the stationary straw-rack and in rear of the grain-board and having the guideways, a horizontally-reciprocating screen-frame carrying a plurality of screens and provided with supporting-blocks which are slidably fitted in and extended through the guideways of the bearing-rails, connecting-bars, 101, attached to the guide-blocks, a fan-shaft having the eccentrics, and pitmen fitted to said eccentrics and attached to the connecting-bars, substantially as described.

33. In a threshing-machine, the combination with an upper shaking-separator and conveyer system, of a longitudinal grain-board situated immediately below said conveyer system, a cleaning-shoe, a lower separator and conveyer hung to vibrate longitudinally of the machine and to deliver over the cleaning-shoe, a stationary rack supported above said cleaning-shoe in line with the delivery end of the lower separator and conveyer, and an endless intermediate conveyer traveling over the grain-board and arranged to sweep into close relation to the lower separator and conveyer and the stationary rack, substantially as and for the purposes described.

34. In a threshing-machine, the combination with an upper shaking-separator and conveyer system, a shoe and a primary fan, of a lower separator and conveyer situated adjacent to the primary fan and having its delivery end above the cleaning-shoe, a stationary rack in line with the delivery end of said lower separator and conveyer, an endless slatted conveyer arranged below the upper shaking-separator and conveyer system and the lower conveyer and rack to have its upper strand or length travel in a reverse direction to the line of travel of the straw upon the upper shaking-separator and conveyer system, and guide devices to direct the lower strand or length of said endless intermediate conveyer into close relation to the lower separator and conveyer and the stationary rack, substantially as and for the purposes described.

35. In a threshing-machine, the combination with an upper shaking-separator and conveyer system having its vibrating straw-board operated from a transverse shaft, and a threshing-cylinder, of an intermediate endless conveyer situated beneath the upper shaking-separator and conveyer system, a primary fan below the threshing-cylinder, a lower separator conveyer hung in the rear of the primary fan and operatively connected thereto, a cleaning-shoe below the delivery end of the lower separator-conveyer, a vibrating grain-board below the lower separator-conveyer and arranged to deliver to the cleaning-shoe, a counter-shaft driven from the threshing-cylinder and operatively connected with the lower separator-conveyer, and power connections between said counter-shaft and the primary fan, for the purposes described, substantially as set forth.

In testimony that I claim the foregoing as my own I have hereto affixed my signature in the presence of two witnesses.

GIDEON MARTEL.

Witnesses:
J. A. ANDERSON,
MATE ERMATINGER.